April 21, 1936. E. SCHATTANECK 2,038,451
DEVICE FOR AERATING FERMENTATION LIQUIDS
Filed April 5, 1935
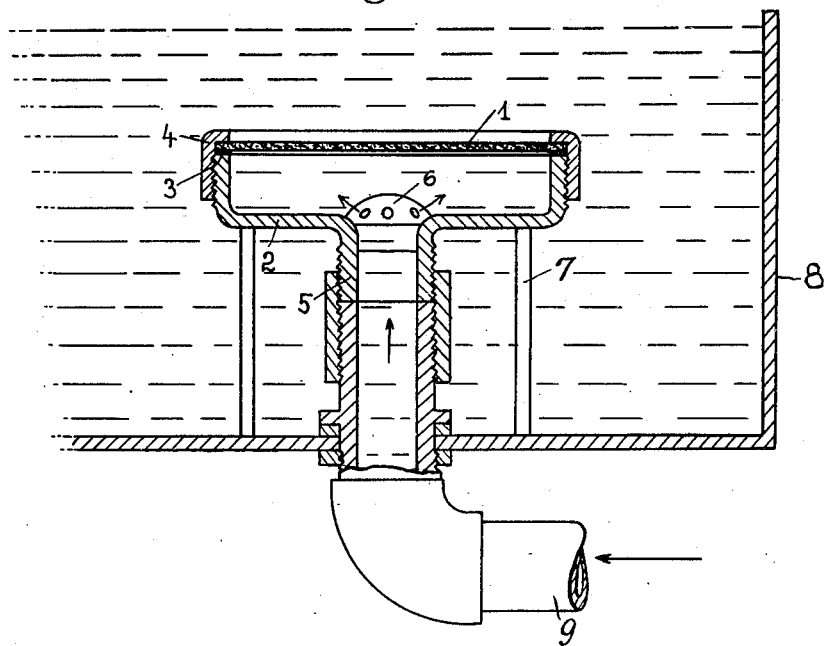

Patented Apr. 21, 1936

2,038,451

UNITED STATES PATENT OFFICE 2,038,451

DEVICE FOR AERATING FERMENTATION LIQUIDS

Erich Schattaneck, Vienna, Austria

Application April 5, 1935, Serial No. 14,945
In Austria March 14, 1934

6 Claims. (Cl. 261—121)

It has been proposed previously to replace the ceramic material used in the construction of foraminous members through which air is forced into fermenting liquids, e. g., the nutrient medium containing propagating yeast with other material, such as porous rubber, porous glass, porcelain, textile and fibrous materials, rubberized textiles or rubber fibrous materials being preferred. From these materials air dividing members are formed which comprise hollow bodies closed at one end and connected at the other end with metal supporting tubes through which air is admitted.

Experiment has now shown that it is not possible from a practical point of view to use any desired porous metal for dividing air in fermentation liquids, since the various metals themselves as well as the form or shape of the air dividing member exhibit different properties with respect to a given liquid.

It has been found that materials, and some of the metals, permit infection centers to develop within the fermenting liquid to a greater or lesser extent after they have been in use a while, which centers inhibit the fermentation and give rise to undesired organisms and so-called "wild strains".

It has further been found that the manufacture of hollow bodies in general, and particularly hollow bodies of porous metal closed at one end, can be carried out with difficulty on account of their complicated structure, and is therefore expensive, and further as a consequence of this complicated form the cleaning and revivification of the same which is necessary after they have been in use for some time, are extremely bothersome and time consuming.

Further, when using hollow bodies for a given case (say in a fermentation vat), a very large air exit surface is required, and therefore a comparatively large quantity of air as well as a somewhat high pressure are required, in order to bring about the formation of fine bubbles of air and to provide intimate contact between air bubbles and all parts of the fermenting liquid. In the case of hollow bodies in no position of the same is it possible to avoid upright (i. e. vertical) and inclined surfaces and the air bubbles issuing from the pores of these surfaces uniting to larger air bubbles, as a result of which a comparatively large part of the surface of the hollow body does not permit fine bubble formation and thorough dispersion, both of which conditions are so desirable. In addition, homogeneous porous metal hollow bodies are difficult to make; as a rule, therefore, not only the individual hollow bodies themselves offer varying frictional resistance to the passage of air at various points, but the hollow bodies differ considerably among themselves in this particular. The result of this is that not only do different hollow bodies have their optimum air permeability at different pressures, but the individual hollow bodies admit air of differing nature at different places.

All these experiments, and also further researches, have resulted in the discovery that porous copper and alloys or compounds, which contain at least 80% copper, give the best result for the aeration of fermentation liquids. Among the metals copper has the greatest oligodynamic action through which the formation of infection centers on the aeration body which are injurious to the fermentation process is made impossible.

Moreover, of the base metals, copper from a chemical aspect behaves most advantageously towards the fermentation liquid, for it is highly resistant to it.

Other base metals, such as iron, nickel, lead or the like not only have a lower oligodynamic effect, but their use is extremely hazardous also on account of their chemical behavior towards the fermentation liquid, and on account of the effect on the fermentation liquid itself resulting therefrom. Noble metals also have a smaller oligodynamic effect and furthermore are too expensive.

It has further been ascertained that the said porous metal is adapted to overcome the aforesaid disadvantages of the known hollow bodies only when they are in the form of plane or moderately domed or cambered (e. g. convex) plates. For plates are comparatively easy and cheap to make and also can be easily cleaned mechanically and after long continued use are easily revivified by igniting in a reducing atmosphere at about 500° C. Further, by choosing the same starting material (powder or granules) and the same production process (sintering process) these porous plates can be made practically uniform and homogeneous, that is to say, the pore size is substantially uniform and offers practically the same resistance to the passage of air, so that for the same air-pressure they effect a uniform aeration by means of fine bubbles of air of the liquid over the whole plate surface. Further, when these plates are disposed horizontally, union of the issuing small air bubbles at the low pressures employed is avoided. As a consequence of all these properties of the plates it is possible, as experiments have shown, to use merely a fraction (about ⅓–⅕) of the air exit surface as compared with previously used hollow bodies, with a corresponding reduction of the air requirement and at reduced pressure, while improved aeration of the fermenting liquid is achieved.

Further, since porous plates of copper or the said alloys or compounds can be made very thin (below 1 mm) in consequence of the strength of the material, and a thickness of 2-3 mm corresponds almost completely to practical requirements, then for this reason also the aeration process can be carried out with a comparatively small air pressure (according to experiments which have been tried 0.1-0.2 atm.).

The accompanying drawing shows in section two constructional modifications of an aerating device.

Fig. 1 shows in fragmentary vertical section, the aerating device in operative position.

Fig. 2 is a modification in which the closure is in the form of a curved plate.

In the two views, the same reference characters refer to similar parts.

1 is a porous copper plate. This plate forms the closure of an impermeable hollow body 2, which, for example, has the form of a cup or a hollow plate and preferably is made of copper or alloys thereof. This plate is fastened (preferably releasably) to the edge of the hollow body by means of a screw cap 4, a bayonet closure or the like, a packing member 3 serving to seal the joint as shown.

The hollow body is provided with an inlet 5 for the supply of air under the requisite pressure and accommodates an air-distributing body 6 known per se, which distributes the air streaming into the hollow body as uniformly as possible on the porous copper plate 1. 8 is a vat containing the fermenting liquid. 9 is a conduit communicating with an air supply (not shown). 7 are legs supporting the member 2.

What I claim is:—

1. In an aerating device for the improved propagation of yeast comprising a hollow member forming an air chamber, means for supplying air to said chamber, a closure member for said chamber and means for securing said closure in position, the improvement consisting therein that said closure member is composed of porous copper.

2. The device described in claim 1 in which the improvements consist therein that the said closure member is composed of a porous copper alloy containing at least 80% copper.

3. In the process of propagating yeast while aerating the nutrient medium in which the yeast is undergoing propagation, the improvement which comprises subdividing the air required in the process by forcing it through a metal plate composed of porous copper, whereby the formation of infection centers is suppressed.

4. The process as set forth in claim 3 in which the said metal plate is composed of a porous copper alloy containing at least 80% copper.

5. In the process of aerating a fermenting liquid, the improvement which comprises forcing the air required in the process through a porous copper plate disposed in said fermenting liquid.

6. The process as set forth in claim 5, in which the aerating plate is a copper alloy.

ERICH SCHATTANECK.